United States Patent [19]

Pearson et al.

[11] 4,232,513

[45] Nov. 11, 1980

[54] PRESSURE RELIEF PANEL FOR AIRCRAFT POWERPLANT

[75] Inventors: Kenneth A. Pearson, Henleaze; Major D. Moorhouse, Stapleton, both of England

[73] Assignee: Rolls-Royce Limited, London, England

[21] Appl. No.: 947,153

[22] Filed: Sep. 29, 1978

[30] Foreign Application Priority Data

Oct. 19, 1977 [GB] United Kingdom ............... 43456/77

[51] Int. Cl.³ .......................... F02G 3/00; F16K 17/14
[52] U.S. Cl. ............................. 60/39.09 R; 60/226 R; 137/797; 220/265
[58] Field of Search .............. 60/39.09 R, 226 R, 262; 137/455, 797; 220/265, 266

[56] References Cited

U.S. PATENT DOCUMENTS

| | | | |
|---|---|---|---|
| 2,958,185 | 11/1960 | Sanders | 60/39.09 R |
| 3,310,197 | 3/1967 | Folmsbee | 220/265 |
| 3,898,799 | 8/1975 | Pollert | 60/226 R |
| 3,964,257 | 6/1976 | Lardellier | 60/226 R |

FOREIGN PATENT DOCUMENTS

459251 8/1949 Canada ........................................ 137/797

*Primary Examiner*—Douglas Hart
*Attorney, Agent, or Firm*—Stevens, Davis, Miller & Mosher

[57] ABSTRACT

A pressure relief panel for an aircraft powerplant comprises a carbon disc designed to fragment when the pressure difference across it reaches a pre-determined level. The panel is designed to totally enclose the disc and has two walls one of which is dished to form the enclosure the other of which is shaped to form a smooth continuation of the powerplant outer surface. The walls are apertured to expose the disc to both ambient pressure and the pressure in the interior of the powerplant wall, the apertures having a total area sufficient to allow passage therethrough of the flow from any of the fluid-carrying pipes within the wall should a leak or breakage occur, but the individual apertures each having an area sufficiently small to prevent escape from the enclosure of potentially dangerous pieces of the disc.

4 Claims, 3 Drawing Figures

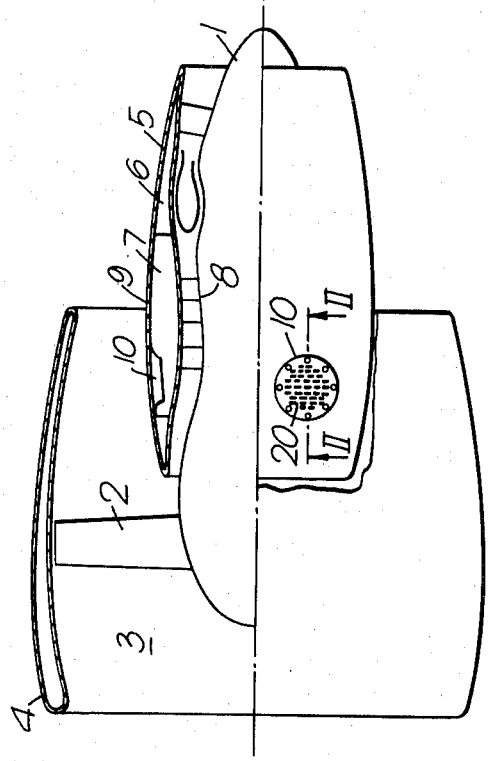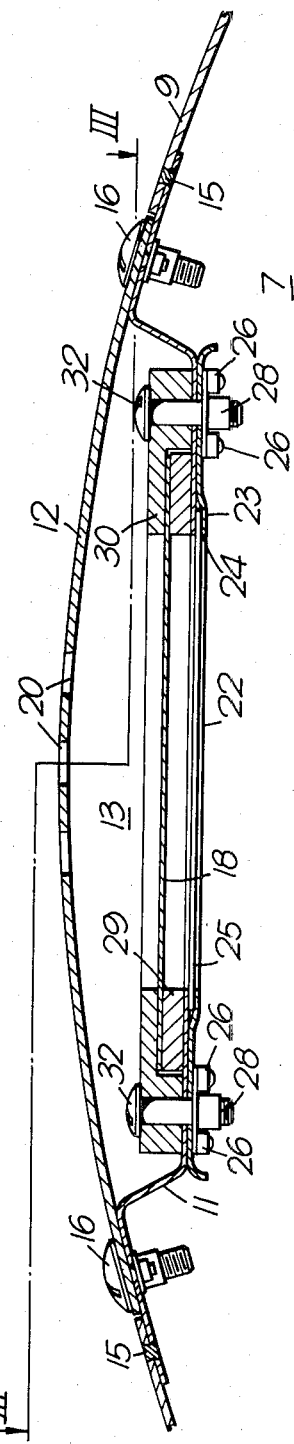

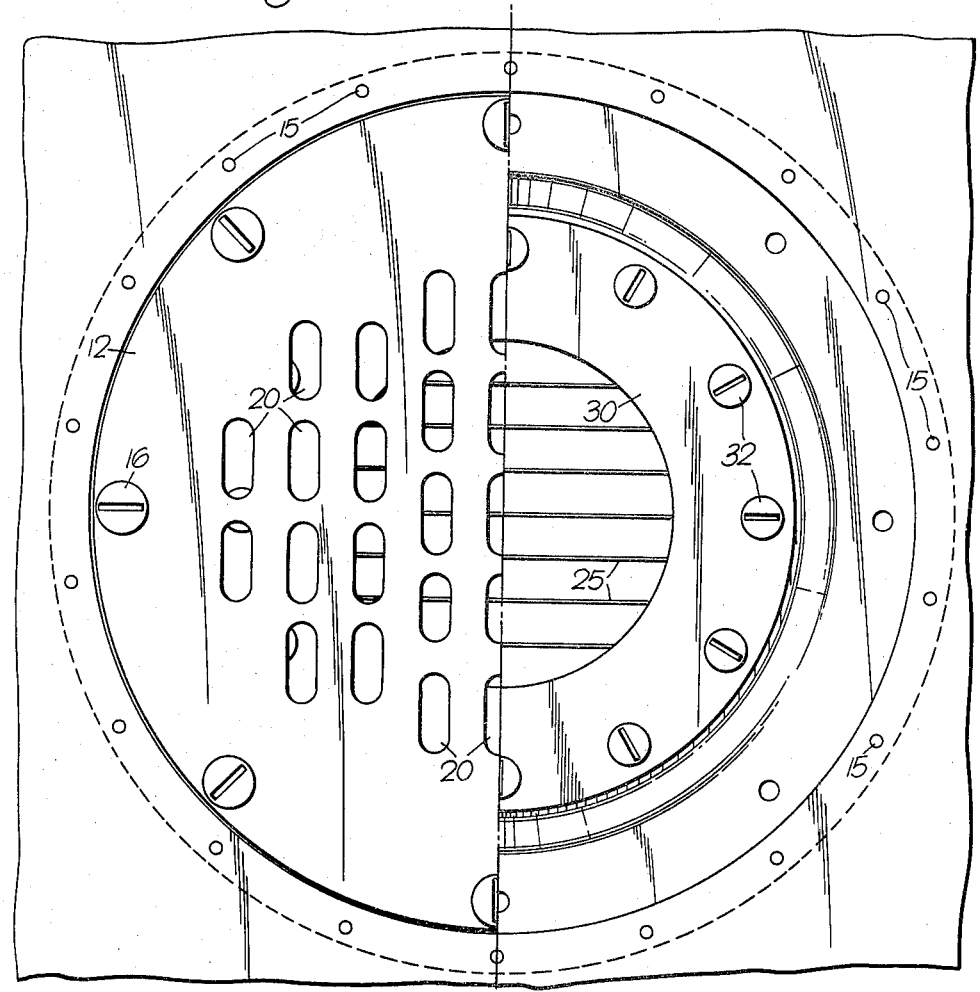

PRESSURE RELIEF PANEL FOR AIRCRAFT POWERPLANT

The present invention relates to pressure relief panels for aircraft powerplant.

Aircraft engines, for example, turboprop, turbojet and ducted fan engines, are usually surrounded by external pods or aircraft fuselage panels, which form the outer wall of the engine installation. Within the outer walls are spaces divided into compartments by bulkheads. The compartments are generally used for housing the engine accessories, air and fuel pipes etc., and are often slightly pressurized.

In order to keep the powerplant weight to a minimum the outer walls and bulkheads are stressed only to withstand a relatively low pressure difference of say five pounds per square inch. Failure of one of the engine high pressure air bleed pipes inside one of the compartments can cause bursting of the outer wall or bulkheads with disastrous consequences to the aircraft on which the powerplant is mounted. To allow for this event, excess pressure relief doors are currently provided in the outer pods or fuselage panels surrounding the engines. These doors are normally spring loaded so as to remain closed to form a smooth continuation of the outer surface of the powerplant, but which can open when the pressure within the powerplant outer wall exceeds a predetermined safety level.

Such flaps and their mechanisms have to be made to current airworthiness standards and are often expensive and constitute a maintenance burden in that they have to be checked and serviced at regular intervals throughout the life of the aircraft.

It is an object of the present invention to provide a simple and inexpensive pressure relief panel which requires a minimum of maintenance.

It is known in other technical fields, for example in gun covers or hydraulic pipes, to use frangible discs which are designed to break up when excess pressure builds up on one side thereof. Such discs have not been used in aircraft powerplant applications however, probably because of the problem that the broken parts of the discs released may jam aircraft flying controls or be ingested into other engines thus providing a hazard to the aircraft. Also in the known applications the discs are clamped between large flanges which would be a severe weight penalty on an aircraft engine installation and, if mounted in the outer wall of a powerplant would provide a drag penalty on the aircraft overall flight performance.

The present invention provides a frangible disc panel for an aircraft powerplant application in which the above problems are overcome.

According to the present invention a pressure relief panel for an aircraft powerplant comprises a frangible diaphragm within an enclosure defined by walls, the first one of the walls including an apertured area which is overlaid by the frangible diaphragm so that in operation the diaphragm is exposed to pressures on both sides of the wall but no flow passes through the wall, the diaphragm being adapted to break up when the pressure difference across the wall exceeds a predetermined minimum, a second one of the walls forming a cover over the diaphragm and adapted to form a smooth continuation of the powerplant outer surface, said second wall being apertured to allow exposure of the interior of the enclosure of the external pressure, the apertures in the second wall being sized so that the total area thereof is sufficient to allow escape of the excess fluid therethrough after break up of the diaphragm, but the individual areas thereof are such as to prevent escape from the enclosure of parts of the diaphragm of such size as to be a potential danger to the aircraft or other powerplants.

In one embodiment of the invention the powerplant comprises a ducted fan gas turbine engine including a core engine which drives a fan and which is surrounded by an external pod in which are formed compartments having radially inner and outer walls.

Alternatively, the powerplant may be buried in an aircraft fuselage which constitutes the outer wall of the powerplant.

In a preferred form of the invention said first wall of the enclosure is an inner wall and is formed by a dished panel attached to the radially outer wall of the pod, or to the aircraft fuselage. Said radially inner wall includes an aperture covered by a protective grille to protect the frangible diaphragm. Said second wall comprises an apertured panel which forms a smooth continuation of the outer wall of the pod or of the fuselage.

The apertures in said second wall are sized to give a minimum drag penalty as the aircraft moves through the air.

The invention will now be more particularly described by way of example only with reference to the accompanying drawings in which:

FIG. 1 is an elevation of a ducted fan gas turbine engine, in which the top half of the figure shows the fan cowl in section, FIG. 2 is an enlarged section on the line II—II of FIG. 1, and FIG. 3 is a two part view on the line III—III of FIG. 2 with the frangible disc removed for the sake of clarity.

Referring now to the drawings in FIG. 1 there is shown a ducted fan gas turbine engine which consists of a core engine 1 which may be of any conventional form, and which drives a fan 2 which is disposed in a fan duct 3, defined between the core engine 1 and an outer fan cowl 4. The core engine 1 is surrounded by an outer cowl, or pod 5. Within the outer cowl 5 are compartments 6 and 7 in which engine accessories (not shown) are mounted. The compartments are defined between radially inner and outer walls 8 and 9 and pressure relief panels 10 are provided in the radially outer wall to vent the compartments to atmosphere in the event of a failure of one of the engine high pressure systems causing a rapid build-up of pressure in the compartment.

Further details of the pressure relief panels 10 are shown in FIGS. 2 and 3, in which it can be seen that each pressure relief panel has radially inner and outer walls 11,12 which define between them an enclosure 13.

The inner wall 11 is riveted at 15 to the outer wall 9 of the pod and the outer wall 12 of the panel is removable by means of set screws 16 to allow access to the inner wall 11 on which is mounted the frangible diaphragm in the form of a disc 18. As can be seen the outer wall 12 of the panel is curved to form a smooth continuation of the outer wall 9 of the pod so as to present a minimum drag penalty on the aircraft. The wall 12 is additionally provided with a series of apertures, in the form of slots 20 which are orientated and sized to produce minimum drag in the air flow over the cowl.

The inner wall 11 consists of a dished circular panel to which is riveted a grille 22. The grille consists of an inner apertured disc 23 which over lies the inner wall 11 which is in turn provided with an aperture 24. Extending across the apertures in the disc 23 and wall 11 are a plurality of wires 25 which are spaced to form the grille. The inner disc 23 is riveted to the wall 11 by means of rivets 26, and between the rivets and the disc 23 are trapped a plurality of nuts 28.

The frangible disc 18 is mounted on the wall 11 and is trapped between support plates 29 and 30 both of which have aligned apertures therein. The outer support plate 30 is screwed to the inner wall 11 by means of screws 32 which engage the nuts 28.

It can be seen therefore that in this example one side of the disc 18 is exposed to the external air pressure in the fan duct 3 and the other side of the disc is exposed to the prevailing pressure in the compartment 7 of the outer cowl 5. The pressure difference across the disc during normal operation of the engine is of the order of one to two psi. If however, the pressure rises above a predetermined value, say five psi, the disc is designed to break up and to allow the excess pressure to escape via the apertures 20 to atmosphere.

The sizes of the apertures 20, and are such that only small pieces of the disc which can cause no hazard to the aircraft are allowed to pass out of the enclosure 13.

The frangible disc is made from a graphite material sold under the name "delanium" by Robert Jenkins Systems Limited. Such discs can be made to be sensitive enough to reliably break up when the predetermined maximum safe pressure difference is experienced, for example, by providing lines of weakness the pattern of which can be determined by experiment.

Several panels may be provided around the pod and, where more than one compartment in the pod may be subject to sudden pressure rises due, for example, to failure of an air or fluid pipe therein, more than one compartment may be provided with these panels.

Although this invention has been described in relation to an inner cowl of a ducted fan gas turbine, clearly where an engine is buried in the fuselage of an aircraft, and the fuselage forms the outer wall of the powerplant, similar pressure relief panels may be provided on the aircraft fuselage without a significant drag penalty.

We claim:

1. A pressure relief panel for an aircraft powerplant comprising a frangible diaphragm within an enclosure defined by walls, the first one of the walls including an apertured area which is overlaid by the frangible diaphragm so that in operation the diaphragm is exposed to pressures on both sides of the wall but no flow passes through the wall, the diaphragm being adapted to break up when the pressure difference across the wall exceeds a predetermined minimum, a second one of the walls forming a cover over the diaphragm and adapted to form a smooth continuation of the powerplant outer surface, said second wall being apertured to allow exposure of the interior of the enclosure to the external pressure, the apertures in the second wall being sized so that the total area thereof is sufficient to allow escape of the excess fluid therethrough after break up of the diaphragm, but the individual areas thereof are such as to prevent escape from the enclosure of parts of the diaphragm of such size as to be a potential danger to the aircraft or other powerplants.

2. A pressure relief panel as claimed in claim 1 and in which said first wall of the enclosure is an inner wall and is formed by a dished panel adapted to be attached to the appropriate wall of the powerplant.

3. A pressure relief panel as claimed in claim 2 and in which the apertured area of the first wall is provided with a protective grille.

4. A gas turbine powerplant having an outer wall, and a pressure relief panel disposed on said outer wall, said pressure relief panel comprising:

a frangible diaphragm within an enclosure defined by walls, the first one of the walls including an apertured area which is overlaid by the frangible diaphragm so that in operation the diaphragm is exposed to pressures on both sides of the wall but no flow passes through the wall, the diaphragm being adapted to break up when the pressure difference across the wall exceeds a predetermined minimum, a second one of the walls forming a cover over the diaphragm and adapted to form a smooth continuation of the powerplant outer surface, said second wall being apertured to allow exposure of the interior of the enclosure to the external pressure, the apertures in the second wall being sized so that the total area thereof is sufficient to allow excape of the excess fluid therethrough after break up of the diaphragm, but the individual areas thereof are such as to prevent escape from the enclosure of parts of the diaphragm of such size as to be a potential danger to the aircraft or other powerplants.

* * * * *